US007159815B2

(12) United States Patent
Alexander et al.

(10) Patent No.: US 7,159,815 B2
(45) Date of Patent: Jan. 9, 2007

(54) METHOD AND APPARATUS FOR SECURING A SPOOL INSIDE A DATA STORAGE TAPE CARTRIDGE

(75) Inventors: Jerry Lee Alexander, St. Paul Park, MN (US); George Phillip Rambosek, Shafer, MN (US); Jerome D. Brown, Wahpeton, ND (US); William Thomas Veno, Thornton, CO (US); William J. Vanderheyden, Loveland, CO (US)

(73) Assignees: Imation Corp., Oakdale, MN (US); Storage Technology Corp., Louisville, CO (US)

( * ) Notice: Subject to any disclaimer, the term of this patent is extended or adjusted under 35 U.S.C. 154(b) by 330 days.

(21) Appl. No.: 10/860,217

(22) Filed: Jun. 3, 2004

(65) Prior Publication Data

US 2005/0284972 A1 Dec. 29, 2005

(51) Int. Cl.
*G11B 23/107* (2006.01)
(52) U.S. Cl. ...................... 242/348; 360/132
(58) Field of Classification Search ............... 242/348, 242/348.2; 360/132
See application file for complete search history.

(56) References Cited

U.S. PATENT DOCUMENTS

| 3,836,096 | A | 9/1974 | Fukushima et al. |
| 3,857,531 | A | 12/1974 | Jantzen |
| 4,581,667 | A | 4/1986 | Gerfast |
| 5,513,815 | A | 5/1996 | Erickson et al. |
| 6,154,342 | A | 11/2000 | Vanderheyden et al. |
| 6,264,126 | B1 | 7/2001 | Shima et al. |
| 6,452,747 | B1 | 9/2002 | Johnson et al. |
| 6,650,504 | B1 | 11/2003 | Ridl |
| 2005/0184181 | A1 | 8/2005 | Hiraguchi |

*Primary Examiner*—John Q. Nguyen
(74) *Attorney, Agent, or Firm*—Dicke, Billig & Czaja, PLLC (57) ABSTRACT

A brake slide assembly for securing a spool inside a data storage tape cartridge housing is disclosed. The brake slide assembly includes at least one brake slide and a flexible member. The brake slide(s) include a locking wedge, a brake button end, and a riser. The locking wedge is configured to selectively engage between the spool and an interior surface of the cartridge. The brake button end is configured to slidingly couple with a brake button of the cartridge. The riser extends between the locking wedge and the brake button end. In this regard, the flexible member is coupled to the brake slide(s).

20 Claims, 7 Drawing Sheets

METHOD AND APPARATUS FOR SECURING A SPOOL INSIDE A DATA STORAGE TAPE CARTRIDGE

THE FIELD OF THE INVENTION

The present invention relates to data storage tape cartridges. More particularly, it relates to a data storage tape cartridge including a brake slide assembly employed to secure a spool inside the cartridge.

BACKGROUND

Data storage tape systems have been used for decades in the computer, audio, and video fields. The data storage tape system includes a tape drive and one or more data storage tape cartridges. During use, storage tape is driven along a tape path between a first tape reel assembly within the cartridge and a second tape reel assembly within the drive. Regardless of exact form, the data storage tape system continues to be a popular format for recording large volumes of information for subsequent retrieval and use.

With the above in mind, a data storage tape cartridge generally consists of an outer shell or housing maintaining at least one tape reel assembly and a length of magnetic storage tape. The storage tape is wrapped about a hub of the tape reel assembly and is driven through a defined path by a driving system. The housing normally includes a separate cover and a separate base. Together, the cover and the base form an opening (or window) at a forward portion of the housing facilitating access to the storage tape by a read/write head upon insertion of the data storage tape cartridge into the tape drive. The interaction between the storage tape and the head can occur within the housing (i.e., a mid-tape load design) or exterior to the housing (i.e., a helical drive design). Where the head/storage tape interaction is exterior to the housing, the data storage tape cartridge normally includes a single tape real assembly employing a leader block or similar device. Alternately, where the head/storage tape interaction is within the housing, a dual tape reel cartridge configuration is typically employed.

Regardless of the number of tape reel assemblies associated with a particular data storage tape cartridge, the tape reel assembly (also known as a spool) generally includes a hub and one or more reel flanges. In general, the hub includes a core that defines a tape winding surface. The reel flanges are optional, and if employed, are disposed at opposite ends of the hub. To this end, the flanges have a spacing slightly wider than a width of the storage tape to facilitate winding of the storage tape onto, and off of, the tape winding surface.

With this in mind, the spacing between the flanges may permit scatter winds to form. As a point of reference, the winding of the storage tape is often characterized by high linear tape speeds. The high speed of the storage tape as it enters the spool entrains air between successive windings of the storage tape, creating winding forces that can result in an axial movement of the storage tape relative to the hub. The axial movement of the storage tape, in combination with the slightly wider spacing of the flanges (as compared to the tape width), results in an occasional edge of the storage tape being staggered at a different elevation than other edges of the wound storage tape. Scatter winds are thus edges of wound storage tape that are not uniformly aligned with the other edges of the wound storage tape.

Prior art data storage tape cartridges are normally provided with brake buttons that engage with the tape reel assembly to prevent the tape reel assembly from rotating as the cartridge is handled. In this regard, the brake button includes engagement teeth configured to mate with a corresponding brake surface formed within (or by) the hub of the tape reel assembly. When the data storage tape cartridge is not engaged with the tape drive (i.e., when the cartridge is being handled), the teeth of the brake button are engaged with the brake surface of the tape reel assembly to prevent rotation of the tape reel assembly. That is to say, the prior art data storage tape cartridges are designed to prevent the rotation of the tape reel assembly when the cartridge is disengaged from the tape drive such that the storage tape does not inadvertently unravel from the tape reel assembly.

While the above-described brake button design does address unintended unraveling of the storage tape, it fails to account for the possible axial displacement of the tape reel assembly within the cartridge housing. In particular, a spool filled with data storage tape has a mass that can achieve a high momentum when the cartridge is handled, for example when the cartridge is accidentally dropped or roughly jostled. To this end, although the tape reel assembly is impeded from rotation due to the engagement of the brake button with the brake surface of the tape reel assembly, the tape reel assembly (and in particular the tape reel flanges) can be rattled inside the cartridge such that the flanges contact and deform the scatter winds of the storage tape. Contact of the flanges with the scatter winds has the potential to crush the data storage tape and damage the "tracks" of information stored along the tape. Consequently, damaged edges of the storage tape can cause storage tape tracking problems and reduce the life cycle of the storage tape.

Scatter winds resulting from the winding and unwinding of storage tape onto tape spools is a common characteristic of data storage tape cartridges. With increasing speeds of reading/writing information, and advanced magnetic tape technology, the accurate and consistent access to information stored on the storage tape is directly related to the condition of the storage tape. To this end, damage to the scatter winds of the storage tape present on a packed spool will reduce the life cycle of the storage tape. Therefore, a need exists for a data storage tape cartridge that minimizes the potential damage to the scatter winds.

SUMMARY

One aspect of the present invention is related to a brake slide assembly for securing a spool inside a data storage tape cartridge housing. The brake slide assembly includes at least one brake slide and a flexible member. The brake slide(s) include a locking wedge, a brake button end, and a riser. The locking wedge is configured to selectively engage between the spool and an interior surface of the cartridge. The brake button end is configured to slidingly couple with a brake button of the cartridge. The riser extends between the locking wedge and the brake button end. In this regard, the flexible member is coupled to the at least one brake slide.

Another aspect of the present invention is related to a data storage tape cartridge. The data storage tape cartridge includes a housing, at least one tape reel assembly, a storage tape, and a brake assembly. The housing defines an enclosed region and a central opening. The at least one tape reel assembly is rotatably disposed within the enclosed region. The storage tape is wound about a tape winding surface of the tape reel assembly. The brake assembly is configured to minimize axial movement of the tape reel assembly and includes a brake button and a brake slide assembly. The brake button is aligned with the central opening and configured to engage with the tape reel assembly. The brake slide assembly is aligned with the brake button and includes at least one brake slide and a flexible member. The brake slide(s) includes a brake button end slidingly coupled to the brake button, and a riser extending from the brake button end and terminating in a locking wedge. To this end, the flexible member is coupled to the brake slide(s). In this regard, an axial movement of the brake button results in a radial movement of the locking wedge, the locking wedge being movable between a locked position and an unlocked position.

Yet another aspect of the present invention is related to a method of securing a spool inside a data storage tape cartridge. The method includes the steps of removing the cartridge from a tape drive, and providing for an axial movement of a brake button disposed within the cartridge. The method additionally includes the step of moving a brake slide disposed within the cartridge in a radial direction in response to the axial movement of the brake button. The method ultimately includes the step of engaging a locking wedge of the brake slide between the spool and an interior surface of the cartridge.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
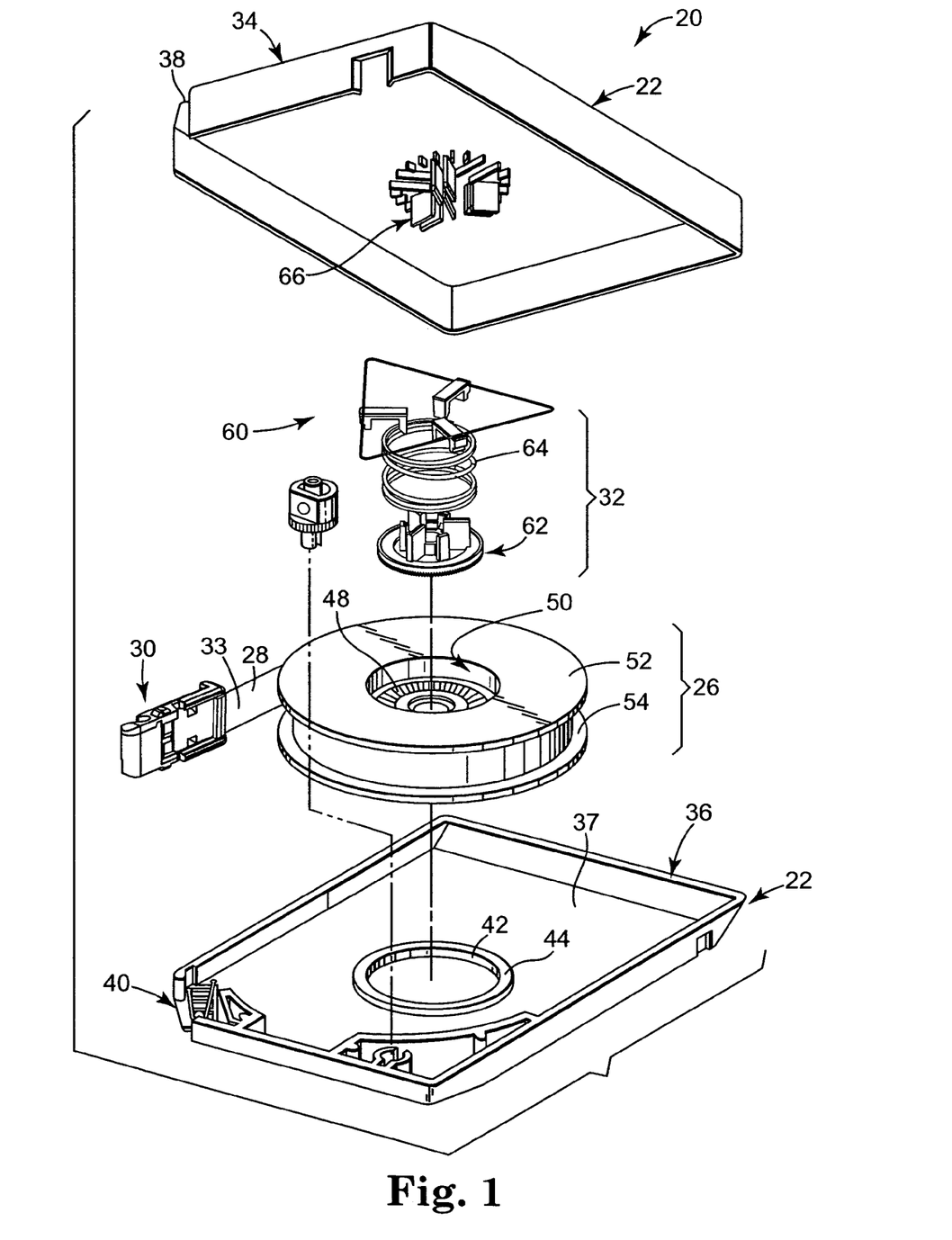
FIG. 1 is a perspective, exploded view of a data storage tape cartridge according to one embodiment of the present invention.

An exemplary single reel data storage tape cartridge according to one embodiment of the present invention is illustrated at 20 in FIG. 1. Generally, the single reel data storage tape cartridge 20 includes a housing 22, a single tape reel assembly 26, a storage tape 28, a leader block 30, and a brake assembly 32. The single tape reel assembly 26 is disposed within the housing 22. The storage tape 28, in turn, is wound about the single tape reel assembly 26 and includes a leading end 33 attached to the leader block 30. As a point of reference, while a single reel data storage tape cartridge 20 is shown, the present invention is equally applicable to other cartridge configurations, such as a dual reel cartridge.

The housing 22 is sized for reception by a typical tape drive (not shown). Thus, the housing 22 exhibits a size of approximately 125 mm×110 mm×21 mm, although other dimensions are equally acceptable. With this in mind, the housing 22 is defined by a first housing section 34 and a second housing section 36. In one embodiment, the first housing section 34 forms a cover whereas the second housing section 36 forms a base. As used throughout the specification, directional terminology such as "cover," "base," "upper," "lower," "top," "bottom," etc., is employed for purposes of illustration only and is in no way limiting.

The first and second housing sections 34 and 36, respectively, are sized to be reciprocally mated to one another to form an enclosed region 37 and are generally rectangular, except for one corner 38 that is preferably angled and forms a tape access window 40. The tape access window 40 serves as an opening for the storage tape 28 to exit from the housing 22 such that the storage tape 28 can be threaded to a tape drive (not shown) when the leader block 30 is removed from the tape access window 40. Conversely, when the leader block 30 is engaged in the tape access window 40, the tape access window 40 is covered.

In addition to forming a portion of the tape access window 40, the second housing section 36 also forms a central opening 42. The central opening 42 facilitates access to the single tape reel assembly 26 by a drive chuck portion of the tape drive (not shown). A raised ring 44 is formed concentrically about the central opening 42 and is configured to couple with a complementary groove (not shown) formed in the tape reel assembly 26. During use, the drive chuck portion disengages the brake assembly 32 from the tape reel assembly 26, lifting the tape reel assembly 26 out of engagement with the raised ring 44 prior to rotating the tape reel assembly 26 for access to the storage tape 28. When the data storage tape cartridge 20 is idle, the brake assembly 32 is engaged and interlocks with a brake interface 48 and the tape reel assembly 26 to selectively "lock" the single tape reel assembly 26 against the raised ring 44. In one embodiment, the brake interface 48 is a gear having teeth. Alternatively, other brake interface configurations are equally acceptable.

The tape reel assembly 26 comprises a hub 50, an upper flange 52, and a lower flange 54. In one embodiment, the hub 50 defines the brake interface 48. The upper and lower flanges 52, 54 extend in a radial fashion from opposing sides of the hub 50, respectively. In one embodiment, the hub 50 and the flanges 52, 54 cooperate to retain multiple wraps of the storage tape 28 around the hub 50 and between the flanges 52, 54.

The storage tape 28 is preferably a magnetic tape of a type commonly known in the art. For example, the storage tape 28 may consist of a balanced polyethylene naphthalate (PEN) based material coated on one side with a layer of magnetic material dispersed within a suitable binder system and coated on the other side with a conductive material dispersed within a suitable binder system. Acceptable magnetic tape is available, for example, from Imation Corp., of Oakdale, Minn.

The leader block 30 covers the tape access window 40 and facilitates retrieval of the storage tape 28. In general terms, the leader block 30 is shaped to conform to the window 40 of the housing 22 and to interact with the tape drive (not shown) by providing a grasping surface for the tape drive to manipulate in delivering the storage tape 28 to the read/write head. In this regard, the leader block 30 can be replaced by other components, such as a dumb-bell shaped pin. Moreover, the leader block 30, or a similar component, can be eliminated entirely, such as with a dual reel cartridge design.

The brake assembly 32 includes a brake slide assembly 60, a brake button 62, and a coiled spring 64. When the cartridge 20 is assembled, the brake button 62 engages with a centering extension 66 projecting from an inside surface of the first housing section 34. The coiled spring 64 is thus disposed between the first housing section 34 and the brake button 62. In this manner, the coiled spring 64 can bias the brake button 62 into engagement with the brake interface 48 of the tape reel assembly 26 to impede rotation of the tape reel assembly 26 when locked. In addition, the brake slide assembly 60 is provided and is configured to slidingly couple with the brake button 62 to impede lateral and axial movement of the tape reel assembly 26. In particular, the brake slide assembly 60 secures the tape reel assembly 26 between the first housing section 34 and the second housing section 36 when locked, as described in detail below.

Figure 2:
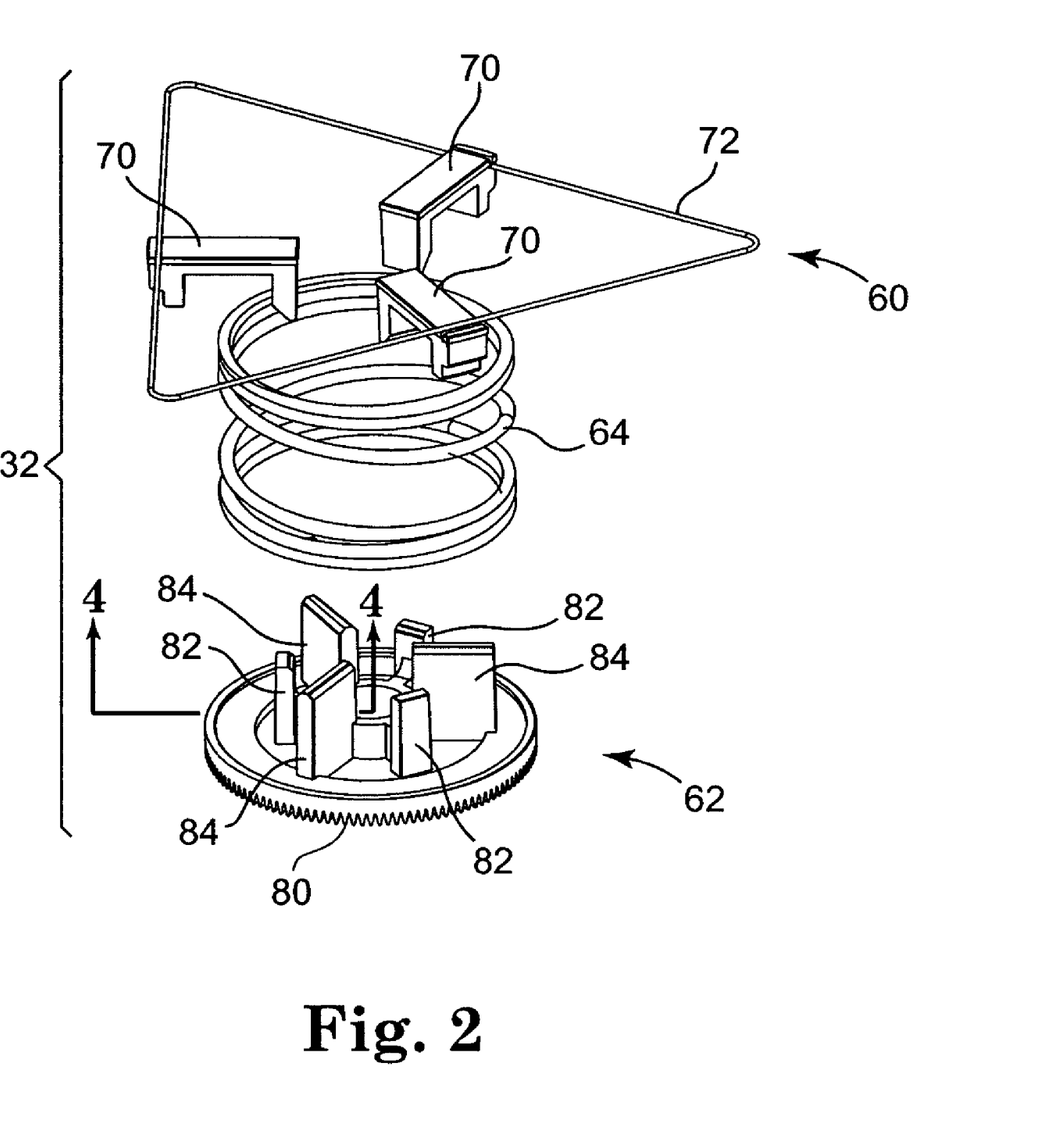
FIG. 2 is a perspective, exploded view of a brake assembly according to one embodiment of the present invention.

FIG. 2 is a perspective, exploded view of the brake assembly 32 showing the brake slide assembly 60, the brake button 62, and the coiled spring 64 positioned between the brake slide assembly 60 and the brake button 62. The brake slide assembly 60 according to one embodiment of the present invention includes brake slides 70 and a flexible member 72 coupled to the brake slides 70. The brake button 62 defines teeth 80 that interlock with the brake interface 48 (FIG. 1) to prevent rotation of the tape reel assembly 26. In addition, the brake button 62 includes posts 82 and brake button guides 84. The posts 82 are configured to slidingly couple with the brake slides 70, as more fully described below. The brake button guides 84 mate with the centering extension 66 formed in the first housing section 34 (FIG. 1) when the cartridge 20 (FIG. 1) is assembled. The coiled spring 64 couples about the brake button 62 and permits the brake button 62 to selectively deflect in an axial direction (when assembled into the cartridge 20) as the brake assembly 32 engages and disengages with the tape reel assembly 26.

Figure 3:
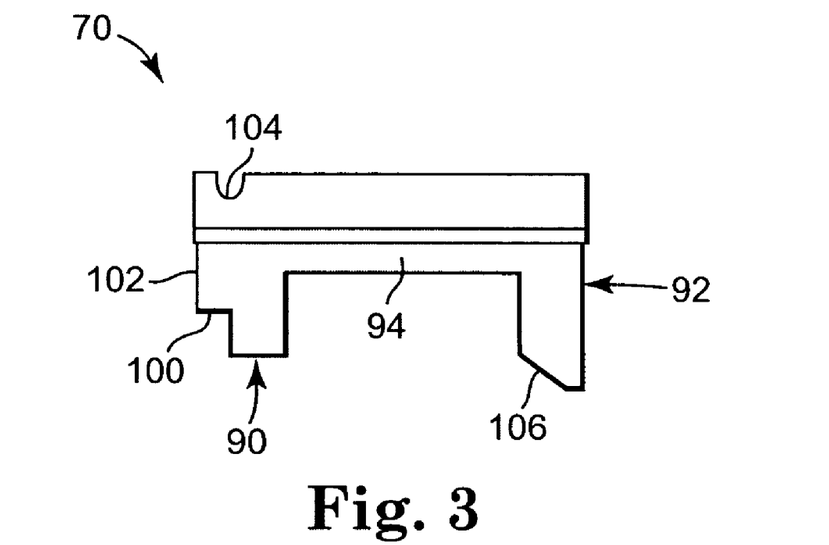
FIG. 3 is a side view of a brake slide of the brake assembly shown in FIG. 2.

With additional reference to FIG. 3, each of the brake slides 70 include a locking wedge 90, a brake button end 92, and a riser 94 extending between the locking wedge 90 and the brake button end 92. Each of the locking wedges 90 defines a rim 100 configured to selectively engage with the hub 50 (FIG. 1) of the tape reel assembly 26 (FIG. 1) when the brake assembly 32 is locked. In addition, each locking wedge 90 defines a hub face 102 configured to slide along the hub 50 as the brake slide 70 moves between an unlocked position and a locked position. Adjacent to the hub face 102 is a recess 104 formed in the locking wedge 90 and adapted for coupling with the flexible member 72 (FIG. 2). In a preferred embodiment, the flexible member 72 is friction-fit into the recess 104. With this in mind, the flexible member 72 elastically stores energy and flexes to provide a restoring force to drive the brake slides 70 to the locked or in-hand position, described below. The brake button end 92 defines an actuation surface 106 adapted to slide against a corresponding post 82 (FIG. 2) of the brake button 62 to move the brake slide 70 to the unlocked position.

The flexible member 72 flexes in response to the movement of the brake slide 70. The flexible member 72, thus flexed, stores elastic energy that enables the brake slide 70 to re-engage with the tape reel assembly 26 when the cartridge 20 is taken from the tape drive 152. With reference to FIG. 2, the flexible member 72 can be formed of either metal or plastic. In one embodiment the flexible member 72 is continuous and is formed in a shape such that three brake slides 70 can be disposed at approximately one hundred and twenty degree intervals relative to each other, although other numbers of brake slides 70 and other configurations are equally acceptable. In an exemplary embodiment, the flexible member 72 is an endless spring having no defined beginning or end. In an alternate embodiment, the flexible member 72 includes overlapping ends configured to slide past one another as the flexible member 72 is deformed. In a preferred embodiment, the flexible member 72 is a living spring, formed for example from a plastic, or formed integrally with the brake slides 70. In the case where the flexible member 72 is formed of plastic, it is preferred that the plastic is elastomeric such that the flexible member 72 can elastically flex and return to its initial, undeformed position. As shown in FIG. 2, the flexible member 72 is triangular in shape, although other shapes and sizes are equally acceptable. In any regard, the flexible member 72 stores elastic energy when the brake slides 70 are not engaged with the tape reel assembly 26 and is capable of elastically moving the brake slides 70 into engagement with the tape reel assembly 26 (FIG. 1). In this manner, as the tape reel assembly 26 is "locked," the flexible member 72 elastically recovers to force the brake slide 70 into the locked position. During unlocking, as the cartridge 20 is inserted into a tape drive 152, the flexible member 72 is flexed and elastically stores energy as the brake slide 70 is moved into the unlocked position.

Figure 4:
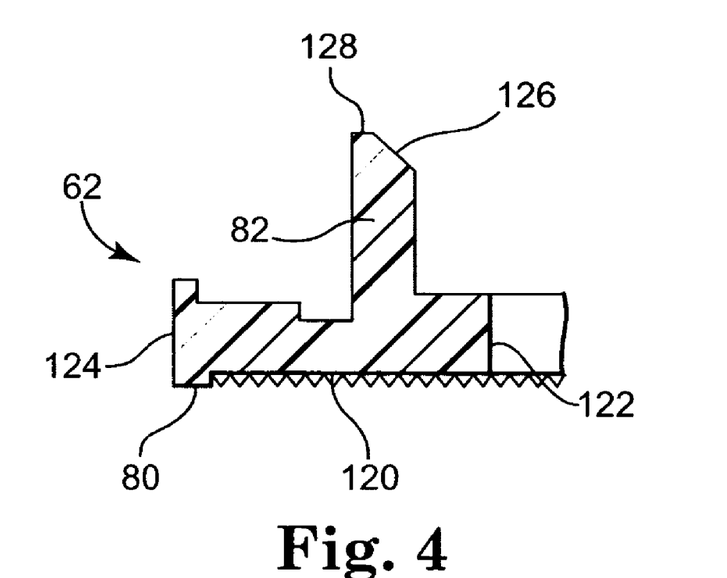
FIG. 4 is a cross-sectional view of a brake button post of the brake assembly shown in FIG. 2.

FIG. 4 is a cross-sectional view of one portion of the brake button 62 shown in FIG. 2. The brake button 62 illustrated in FIG. 2 includes three posts 82. However, for illustrative purposes, the view illustrated in FIG. 4 is a cross-section of one segment of the brake button 62 including only one of the posts 82. With this in mind, the brake button 62 defines a base 120 extending between a spindle wall 122 and an outer edge 124. The teeth 80 are defined at an outer perimeter of the base 120, adjacent to the outer edge 124, and extend around the circumference of the brake button 62. In addition, the post 82 extends upwardly (relative to the orientation shown in FIG. 4) from the base 120 and is formed integrally with the base 120. The post 82 terminates in a sloping surface 126 angled away from a flat 128. The brake button guides 84 (FIG. 2) alternate in position with the posts 82, the brake button guides 84 being configured to couple with the first housing section 34 (FIG. 1) in assembly of the cartridge 20 (FIG. 1).

Figure 5A:
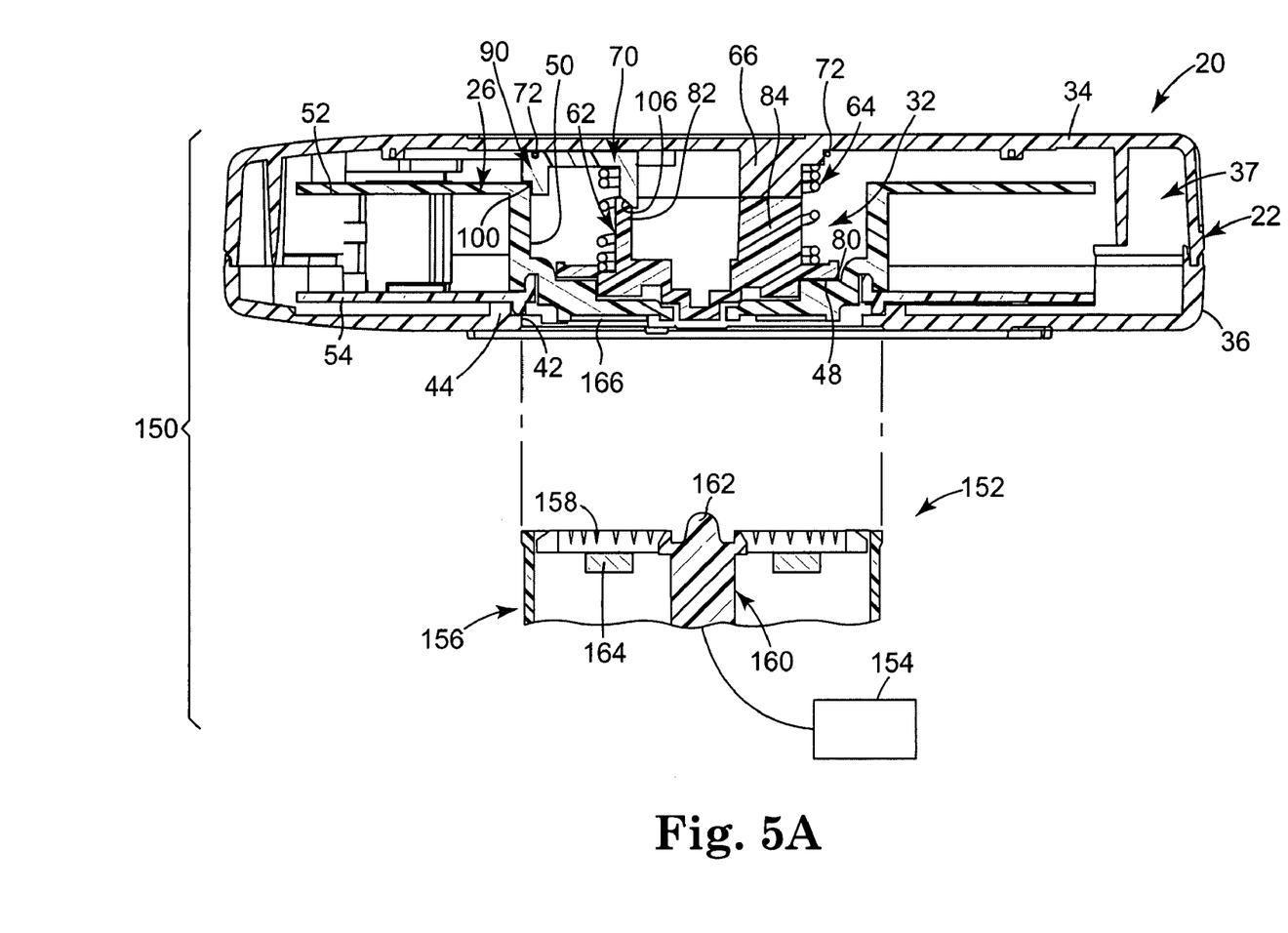
FIG. 5A is a cross-sectional view of an assembled data storage tape cartridge not coupled to a tape drive and thus showing an engaged brake assembly.

The data storage tape cartridge 20, including the brake assembly 32, is shown in a final, assembled form in FIG. 5A. The brake assembly 32 is engaged with the tape reel assembly 26 such that the tape reel assembly 26 cannot rotate or move axially. In this manner, the tape reel assembly 26 is "locked" and the brake assembly 32 is in a "locked position," which is the case whenever the data storage tape cartridge 20 is not in a tape drive (i.e., the cartridge 20 is "in hand"). For ease of illustration, the storage tape 28 (FIG. 1) has been omitted from the view of FIG. 5A.

As previously described, the tape reel assembly 26 and the brake assembly 32 are disposed within the enclosed region 37 defined by the housing 22. Specifically, the hub 50 of the tape reel assembly 26 and the brake button 62 are axially aligned with the opening 42. As assembled, the brake button 62 is disposed within the hub 50 and the coiled spring 64 is disposed co-axially about the brake button 62.

The brake button guides 84 mate with the centering extension 66 such that the coiled spring 64 can bias the brake button 62 into engagement with the tape reel assembly 26. With this configuration, when the brake assembly 32 is engaged in the locked position as shown, the spring 64 is adapted to drive the teeth 80 of the brake button 62 into engagement with the brake interface 48 of the tape reel assembly 26. To this end, the brake button 62 impedes rotation of the tape reel assembly 26, and the brake slides 70 (one of which is shown) are engaged with the hub 50 to constrain movement of the tape reel assembly 26. Specifically, the rim 100 of the locking wedge 90 is engaged with the hub 50 such that the tape reel assembly 26 is constrained from moving axially (i.e., up and down) and radially (i.e., left and right). Moreover, the ring 44 engages with a complementary groove formed in the tape reel assembly 26 (adjacent to the lower flange 54) to prevent radial movement of the tape reel assembly 26. In this manner, the brake button 62 impedes rotation of the tape reel assembly 26, the ring 44 prevents radial or in-plane movement of the tape reel assembly 26, and the brake assembly 32, in combination with the brake button 62, prevents axial movement of the tape reel assembly 26 within the enclosed region 37.

As a point of reference, the data storage tape cartridge 20 is shown in FIG. 5A as part of a tape drive system 150, prior to the data storage tape cartridge 20 being coupled to the system 150. The tape drive system 150 includes the data storage tape cartridge 20 and a tape drive 152. The tape drive 152 includes a motor 154 (shown schematically) and a drive chuck 156. The drive chuck 156 is rotatably driven by the motor 154 and includes engagement teeth 158 and a spindle 160. In particular, the engagement teeth 158 are connected to the spindle 160, with the spindle 160 terminated at a rounded tip 162. In one embodiment, the drive chuck 156 includes a magnet 164 configured to magnetically couple with an optional washer 166 attached to the tape reel assembly 26 during chuck-up of the data storage tape cartridge 20 with the tape drive 152.

Figure 5B:
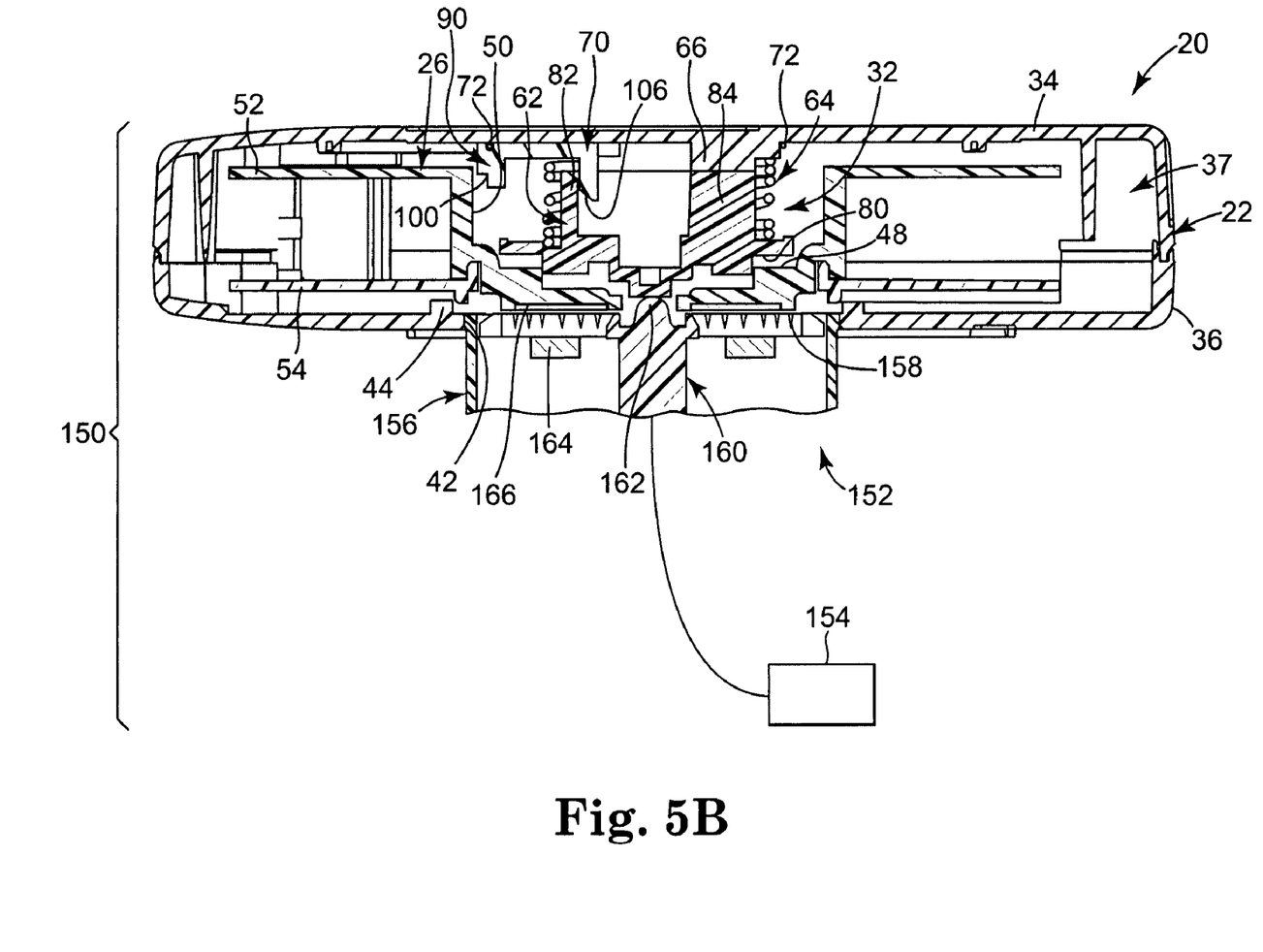
FIG. 5B is a cross-sectional view of an assembled data storage tape cartridge coupled with a drive chuck illustrating a disengaged brake assembly.

Reading or writing information to the storage tape 28 (FIG. 1) is enabled by the tape drive system 150. FIG. 5B illustrates the data storage tape cartridge 20 as it would appear in cross-section when inserted into the tape drive 152. Coupling the data storage tape cartridge 20 with the tape drive 152 causes the spindle 160 to engage with the brake assembly 32 such that the drive chuck 156 engages with the tape reel assembly 26 immediately thereafter. More particularly, the rounded tip 162 of the spindle 160 pushes the brake button 62 out of the locked position. The movement of the spindle 160 (upward relative to the orientation of FIGS. 5A and 5B) overcomes the bias of the coiled spring 64, causing the teeth 80 of the brake button 62 to disengage from the brake interface 48 of the tape reel assembly 26, and causing the actuation surface 106 of each brake slide 70 to slide along the sloping surface 126 (FIG. 4) of the post 82 as the post 82 travels upward (relative to the orientation shown in FIGS. 5A and 5B). In this manner, axial movement of the brake button 62 results in an inward radial movement of the locking wedge 90.

As best shown in FIG. 5B, the upward movement of the post 82 ultimately displaces the brake slide 70 (only one of which is visible in cross-section) sufficiently such that the locking wedge 90 disengages from the hub 50, and the tape reel assembly 26 is freely positioned between the first 34 and second housing sections 36. In this manner, when the cartridge 20 is engaged in the tape drive 152, the drive chuck 156 can be rotated by the motor 154 such that the tape reel assembly 26 is rotated and data can be written to, and read from, the storage tape 28 (FIG.1).

Figure 6:
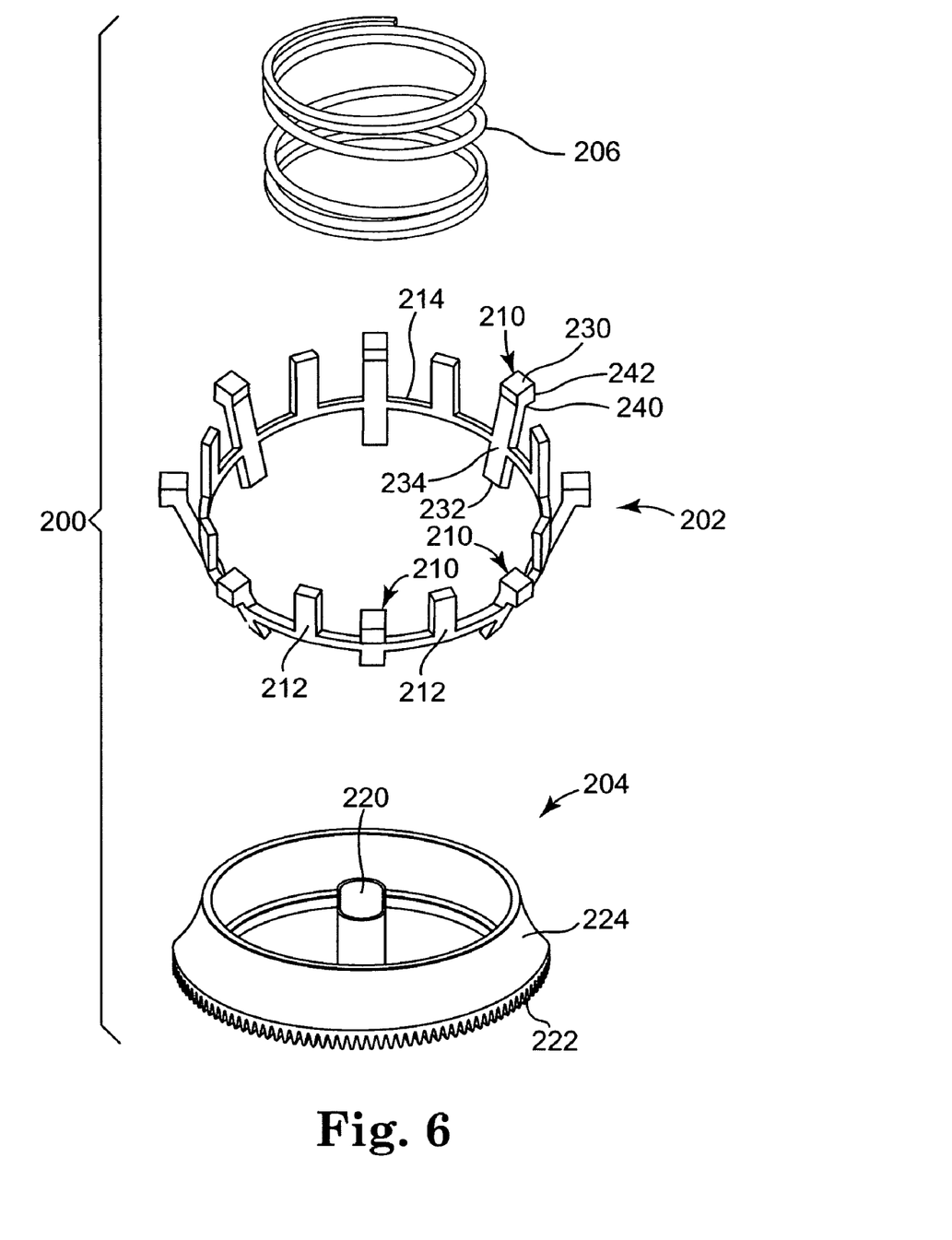
FIG. 6 is a perspective, exploded view of an alternate brake assembly according to one embodiment of the present invention.

An alternate brake assembly according to one embodiment of the present invention is illustrated at 200 in FIG. 6. The brake assembly 200 includes a brake slide assembly 202, a brake button 204, and a coiled spring 206. The brake slide assembly 202 includes brake slides 210 and standoffs 212. In one embodiment, the brake slides 210 and the standoffs 212 alternate and are coupled to the unitary brake slide assembly 202 by a flexible member 214.

The brake button 204 defines an axle 220, teeth 222, and a curved engagement face 224. The axle 220 is configured to engage with the cartridge housing such that the coiled spring 206 is approximately centered within the brake slide assembly 202. With additional reference to FIG. 2, the teeth 222 are configured to interlock with the brake interface 48 on the tape reel assembly 26. The engagement face 224 curves to engage with the brake slide assembly 202 such that an upward movement of the brake button 204 translates to a radial movement of the brake slides 210, as described below.

With regard to the brake slide assembly 202, each of the brake slides 210 includes a locking wedge 230, a brake button end 232, and a riser 234 extending between the locking wedge 230 and the brake button end 232. The locking wedge 230 defines a rim 240 configured to selectively engage with the hub 50 of the tape reel assembly 26 (FIG. 1) when the brake assembly 200 is locked. In addition, each of the locking wedges 230 define a hub face 242 configured to slide along the hub 50 as the brake slides 210 move between an unlocked position and a locked position. As illustrated in FIG. 6, each of the brake slides 210 is coupled to the flexible member 214 along the riser 234.

The standoffs 212 alternate in position with the brake slides 210, although other configurations are acceptable. The standoffs 212 extend upwardly (relative to the orientation shown in FIG. 6) from the flexible member 214. The standoffs 212 couple to an interior of a cartridge 20' (described below) and secure the brake slide assembly 202 relative to the cartridge 20'. In this manner, the standoffs 212 are fixed within the cartridge 20' and anchor the brake slide assembly 202 such that the brake slides 210 flex (i.e., rotate) about the flexible member 214 in response to a compressive force from the brake button 204.

The flexible member 214 defines a position about which the brake slides 210 pivot. The flexible member 214 can store elastic energy, and transfer the stored elastic energy into kinetic energy via movement of the brake slide 210. In this sense, the flexible member 214 is akin to the flexible member 72 (FIG. 2) described above. In one embodiment, the flexible member 214 is an endless band integrally formed with the brake slides 210 and the standoffs 212. In an alternate embodiment, the flexible member 214 is formed separately and subsequently attached to the brake slides 210 and the standoffs 212. In any regard, the flexible member 214 flexes in response to an upward force delivered by the brake button 204 and stores elastic energy useful in subsequently driving the brake slides 210 into the locked position. To this end, an axial movement of the brake button 204 results in a radial movement of the locking wedges 230, the locking wedges 230 movable between a locked position and an unlocked position.

Figure 7A:
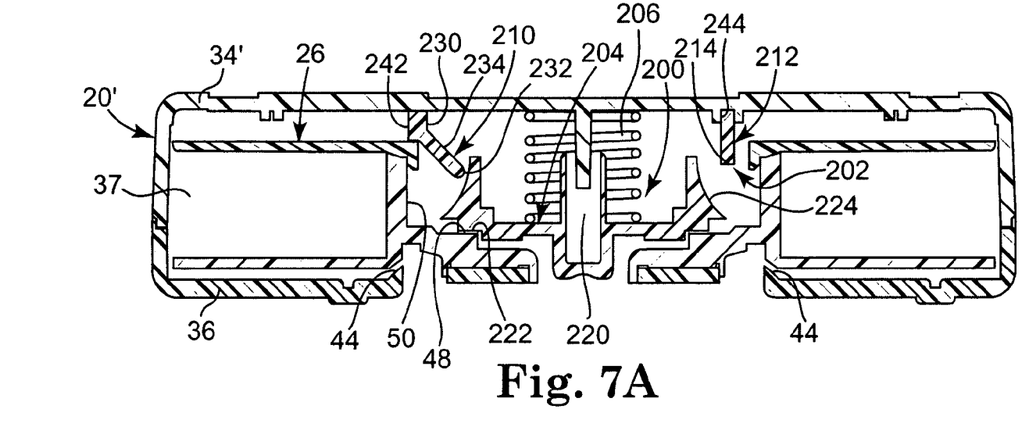
FIG. 7A is a cross-sectional view of an assembled data storage tape cartridge illustrating the brake assembly of FIG. 6 in an engaged position.

FIG. 7A is a cross sectional view of an assembled data storage tape cartridge 20' illustrating the brake assembly 200 in the locked position. The standoffs 212 engage with a segmented groove 244 formed in a top interior portion of the cartridge 20' to fix the brake slide assembly 202 within the cartridge 20'. A series of segmented grooves 244 are formed in the cartridge 20' to align with the standoffs 212, and for this reason, only one segmented groove 244 is visible in the cross-section of FIG. 7A. The brake slide assembly 202 is not compressed by the brake button 204, and the flexible member 214 has released stored elastic energy in driving the brake slides 210 into engagement with the tape reel assembly 26, as described below. When the data storage tape cartridge 20' is "in hand," that is to say, not engaged with the tape drive 152 (FIG. 5A), the brake assembly 200 is engaged such that the tape reel assembly 26 is unable to rotate or move axially.

As illustrated in FIG. 7A, the spring 206 is biasing the brake button 204 such that the teeth 222 engage the brake interface 48 of the tape reel assembly 26, thus impeding the rotation of the tape reel assembly 26. The brake slide assembly 202 occupies a relaxed state (as shown in FIG. 6) such that the brake slides 210 extend conically and the standoffs 212 extend upwardly. To this end, the brake slides 210 have been driven by the elastic energy stored in the flexible member 214 into engagement between the tape reel assembly 26 and the cartridge 20'. Specifically, the locking wedges 230 of each of the brake slides 210 (only one of which is visible in the cross-section of FIG. 7A) are secured between the tape reel assembly 26 and the first housing section 34'. Each riser 234 extends between a corresponding locking wedge 230 and a corresponding brake button end 232. In this manner, each of the brake slides 210 extends from the brake button 204 to the tape reel assembly 26, and the corresponding locking wedges 230 are driven into a locked position with the tape reel assembly 26.

Figure 7B:
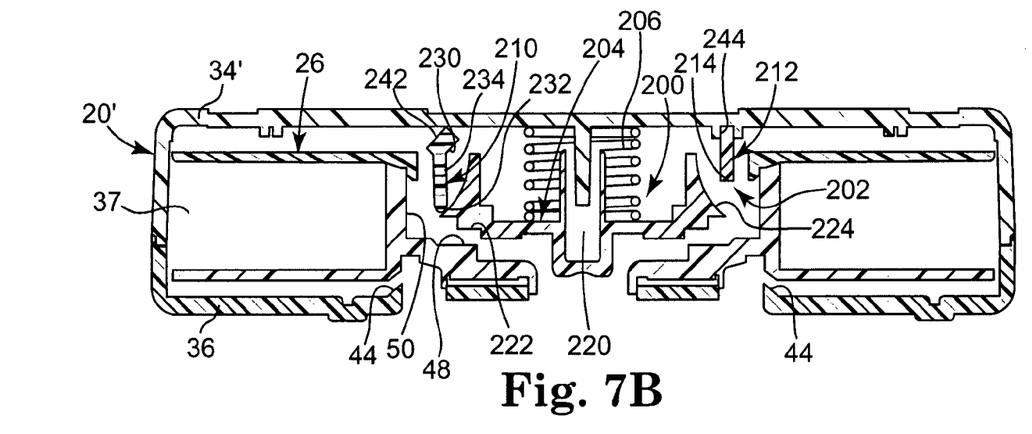
FIG. 7B is a cross-sectional view of the assembled data storage tape cartridge of FIG. 7A with the brake assembly in a disengaged position.

FIG. 7B illustrates the data storage tape cartridge 20' engaged with a tape drive (not shown) such that the brake assembly 200 is disengaged, and the tape reel assembly 26 is free to move. In the illustration of FIG. 7B, the tape drive has been omitted for ease of illustration, although it has the function and the structure of the tape drive 152 shown in FIG. 5A. With this in mind, in unlocking the tape reel assembly 26, the tape drive has forced the brake button 204 upward relative to the orientation of FIG. 7B. The upward motion of the brake button 204 has caused the brake button end 232 of each of the brake slides 210 to slide against the engagement face 224 of the brake button 204, thus compressing the brake slide assembly 202. In this regard, the brake slides 210 rotate about the flexible member 214 because the flexible member 214 is fixed in relation to the cartridge 20' by the standoffs 212. The fixed position of the standoffs 212 coupled in the segmented grooves 244, in combination with a conical shape of the brake slide assembly 202 (FIG. 6), stores elastic energy in the flexible member 214 when the brake slides 210 are compressed by an upward movement of the brake button 204 (i.e., the brake slide assembly 202 is in a compressed state when in the unlocked position). As a point of clarification, the stored elastic energy in the flexible member 214 can later be released when the cartridge 20' is removed from the tape drive; the elastic energy driving the brake slides 210 into engagement with the tape reel assembly 26 as the brake slide assembly 202 returns to a non-compressed state (i.e., the brake slide assembly 202 is in the locked position).

Upon insertion of the cartridge 20' with the tape drive, the locking wedges 230 disengage from the hub 50 as the brake slide assembly 202 is deformed from the conical shape, and the brake slide assembly 202 becomes fully disengaged, permitting movement and rotation of the tape reel assembly 26. To this end, the flexible member 214 (FIG. 6) acts as a pivot point about which the brake slides 210 move as they translate between the locked and unlocked positions. Consequently, after the locking wedges 230 have disengaged from the tape reel assembly 26 in response to the compressive force of the brake button 204, the tape reel assembly 26 is positioned between a first 34' and second housing sections 36 such that the tape reel assembly 26 does not couple with the raised ring 44. In other words, the tape reel assembly 26 is free to move (rotate) within the enclosed region 37 as information is written to, and read from, the data storage tape 28 (FIG. 1).

A variety of brake slide assemblies have been disclosed. The brake slide assemblies impede the tape reel assembly from "bouncing around" inside the enclosed region of a data storage tape cartridge. The brake slide assemblies define specific structure that functions to ensure the flanges of the tape reel assembly do not flex or deform as the cartridge is handled. Specifically, the brake slide assemblies described herein secure the tape reel assembly when the data storage tape cartridge is "in hand" such that the flanges are prevented from bending and crushing scatter winds of the data storage tape.

Although specific embodiments have been illustrated and described in this written description, it will be appreciated by those of ordinary skill in the art that a variety of alternate and/or equivalent implementations may be substituted for the specific embodiments shown and described without departing from the scope of the present invention. This application is intended to cover any adaptations or variations of assemblies employed to secure a tape reel assembly and impede its axial, rotational, radial, or in-plane movement within a data storage tape cartridge. Therefore, it is intended that this invention be limited only by the claims and their equivalents.

What is claimed is:

1. A brake slide assembly for securing a spool inside a data storage tape cartridge housing, the brake slide assembly comprising:
   at least one brake slide including:
      a locking wedge configured to selectively engage between the spool and an interior surface of the cartridge,
      a brake button end configured to slidingly couple with a brake button of the cartridge,
      a riser extending between the locking wedge and the brake button end; and
   a flexible member coupled to the at least one brake slide.

2. The brake slide assembly of claim 1, wherein the locking wedge includes a rim configured to selectively engage with the spool.

3. The brake slide assembly of claim 1, wherein the flexible member is an elastic flexible member.

4. The brake slide assembly of claim 1, wherein three brake slides are coupled along their respective locking wedges to a triangular flexible member.

5. The brake slide assembly of claim 1, wherein at least three brake slides are coupled along their respective risers to a circular flexible member.

6. A data storage tape cartridge comprising:
   a housing defining an enclosed region and a central opening;
   at least one tape reel assembly rotatably disposed within the enclosed region;
   a storage tape wound about a tape winding surface of the tape reel assembly; and
   a brake assembly configured to minimize axial movement of the tape reel assembly, the brake assembly including:
      a brake button aligned with the central opening and configured to engage with the tape reel assembly,
      a brake slide assembly aligned with the brake button and including:
         at least one brake slide including:

a brake button end slidingly coupled to the brake button, a riser extending from the brake button end and terminating in a locking wedge;

a flexible member coupled to the at least one brake slide;

wherein an axial movement of the brake button results in a radial movement of the locking wedge, the locking wedge movable between a locked position and an unlocked position.

7. The data storage tape cartridge of claim 6, wherein the housing includes a cover and a base, the central opening formed in the base, the base including a raised ring formed concentrically about the central opening on an interior surface thereof and adapted to engage with the at least on tape reel assembly.

8. The data storage tape cartridge of claim 7, wherein the tape reel assembly is configured to be secured between the raised ring and the locking wedge when the locking wedge is in the locked position.

9. The data storage tape cartridge of claim 6, wherein the brake button defines:

teeth configured to couple with the tape reel assembly; and at least one post extending from the brake button opposite the teeth, the at least one post defining a sloping surface configured to slidingly couple with the brake button end of the brake slide.

10. The data storage tape cartridge of claim 6, wherein the brake slide assembly includes three brake slides circumferentially spaced about the tape reel assembly and coupled along the locking wedges to a triangular flexible member, the brake slides adapted for driving by the flexible member into the locked position.

11. The data storage tape cartridge of claim 10, wherein the brake slides are radially spaced about the tape reel assembly in 120 degree intervals.

12. The data storage tape cartridge of claim 6, wherein the brake slide assembly is formed as a circular ring including at least three brake slides circumferentially spaced about a circular flexible member.

13. The data storage tape cartridge of claim 12, wherein the brake slide assembly is integrally formed and the circular flexible member is coupled between the risers of the brake slides.

14. A method of securing a spool inside a data storage tape cartridge comprising:

removing the cartridge from a tape drive;

providing for an axial movement of a brake button disposed within the cartridge;

moving a brake slide disposed within the cartridge in a radial direction in response to the axial movement of the brake button; and engaging a locking wedge of the brake slide between the spool and an interior surface of the cartridge.

15. The method of claim 14, wherein removing the cartridge from a tape drive includes disengaging a drive chuck of the tape drive from drive teeth of the spool.

16. The method of claim 14, wherein providing for an axial movement of a brake button includes moving a brake button into engagement with brake teeth formed on the spool to impede rotation of the spool.

17. The method of claim 14, wherein moving a brake slide includes providing a brake slide assembly having at least one brake slide, the brake slide assembly coupled with the brake button such that an axial movement of the brake button translates to radial movement of the at least one brake slide.

18. The method of claim 14, wherein moving a brake slide includes moving at least two brake slides in a radial direction in response to the axial movement of the brake button.

19. The method of claim 14, wherein moving a brake slide includes employing a flexible member of a brake slide assembly to force at least one brake slide of the assembly in a radial direction.

20. The method of claim 14, wherein engaging a locking wedge of the brake slide includes securing the spool between the locking wedge and a raised ring formed on an interior surface of a bottom portion of the cartridge.

* * * * *